2,785,962

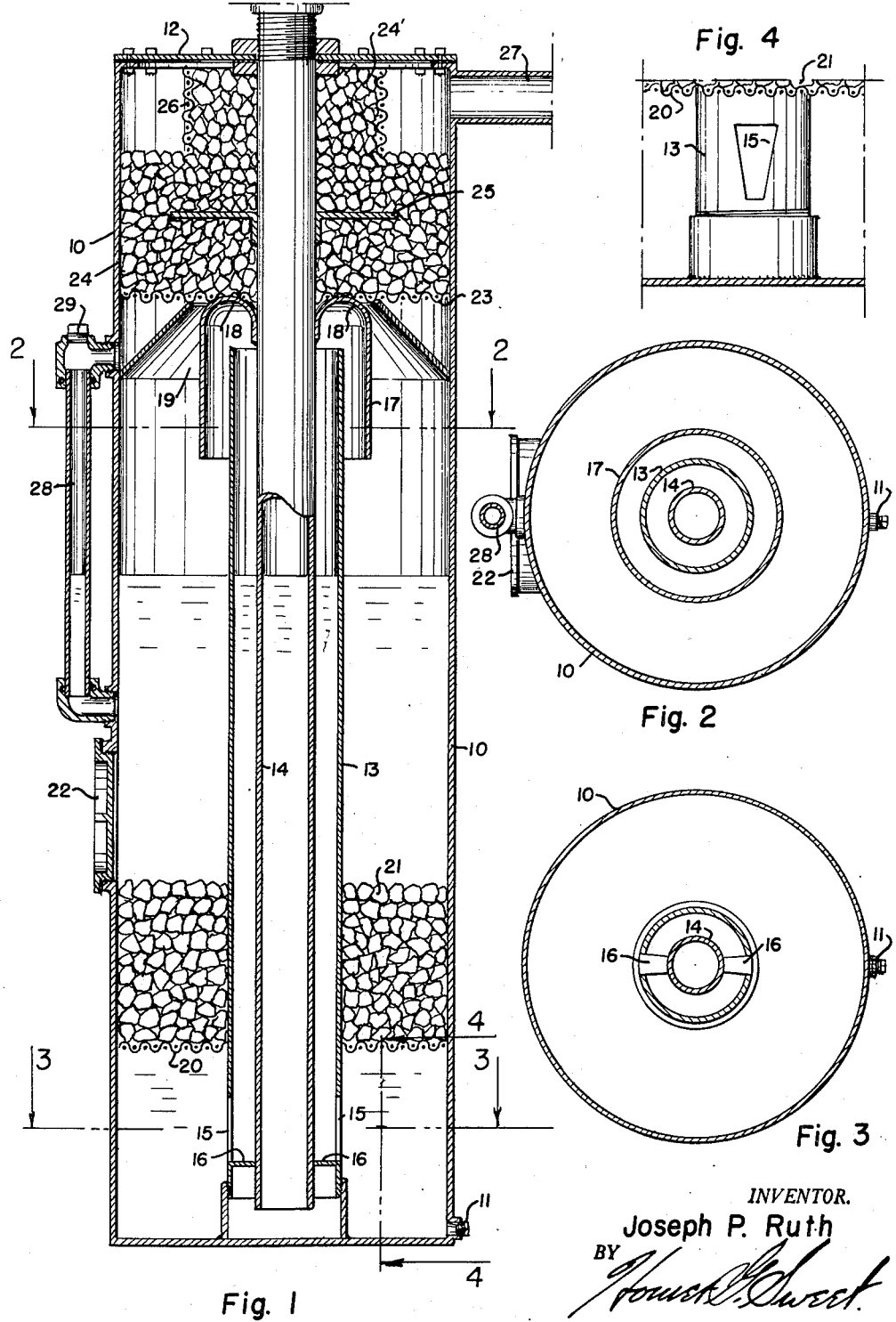

United States Patent Office
Patented Mar. 19, 1957

2,785,962

EXHAUST GAS CONDITIONER

Joseph P. Ruth, Denver, Colo.

Application November 1, 1954, Serial No. 465,790

8 Claims. (Cl. 23—284)

As a development from and an improvement over the apparatus disclosed in my Patent Number 2,677,601, dated May 4, 1954, Number 2,678,261, dated May 11, 1954, and my pending application Serial No. 396,049, filed December 3, 1953, the instant invention relates to exhaust gas conditioners operable in accordance with and to give effect to the principles of the method described in my Patent Number 2,611,680, dated September 23, 1952, and has as an object to provide a novel, improved, and efficient construction and organization of elements constituting an exhaust gas conditioner particularly suited for use on and with certain types of automotive vehicles.

A further object of the invention is to provide a novel and improved exhaust gas conditioner effectively operable to successively and repetitiously subject internal combustion engine exhaust gases to ameliorating influences in direct and sole reaction to the exhaust gas output pressures.

A further object of the invention is to provide a novel and improved exhaust gas conditioner effective to thoroughly scrub and dewater the gases passed therethrough.

A further object of the invention is to provide a novel and improved exhaust gas conditioner efficiently operable to cool, cleanse, and suppress the noxious properties of gases passed therethrough without consequent development of adverse back pressures.

A further object of the invention is to provide a novel and improved exhaust gas conditioner operable with such conservation of a water charge utilized therein as adapts the unit for extended continuous use.

A further object of the invention is to provide a novel and improved exhaust gas conditioner of compact, convenient form proportioned to operative capacity in a manner adapting the unit for use on and with automotive vehicles.

With the foregoing and other objects in view, my invention consists in the construction, arrangement, and operative combination of elements as hereinafter set forth, pointed out in my claims, and illustrated by the accompanying drawing, in which:

Figure 1 is a vertical section taken substantially axially through a typical and preferred embodiment of the invention.

Figure 2 is a cross section taken substantially on the indicated line 2—2 of Figure 1.

Figure 3 is a cross section taken substantially on the indicated line 3—3 of Figure 1.

Figure 4 is a fragmentary, detail section of elements of the organization according to Figure 1 as viewed from the zone indicated at 4—4 in the latter view.

In the construction of the improvement as shown, the numeral 10 designates an upright, preferably tubular, axially elongated casing closed at its bottom to confine a charge of water in its lower portion, furnished with a normally-plugged drain outlet 11 adjacent the bottom, and normally closed at its otherwise open upper end by a detachable plate 12. Coaxially within the casing 10, a conduit 13 fixedly upstands from the casing bottom to terminate in an open end spaced below the plate 12 a distance on the order of one-fourth the casing height, and a gas input line 14 is sealed centrally through the plate 12 and extends in coaxial relation with the casing and interiorly of the conduit 13 in spaced relation with the latter to terminate in an open delivery end spacedly adjacent the casing bottom, so that, when the line 14 is connected to receive and transmit the exhaust gas flow from an internal combustion engine, the gas output of the engine is delivered within and adjacent the base of the conduit 13 for uprise through the space between said conduit and line to escape to the casing interior through the annular opening at the upper end of the conduit. Downwardly-tapered apertures 15 intersect the lower end of the conduit 13 in registration diametrically thereof slightly above the delivery end of the line 14, and lugs 16 instruck from lower margins of said openings bear at their ends against adjacent wall areas of said line to position and steady the latter as well as to diffuse and spirally direct the gas flow uprising past said lugs from its delivery to the base of the conduit. The lower portion of the casing 10 confines a charge of water rising within the casing to a maximum level height well below the upper end of the conduit 13, from which charge water enters the conduit through the apertures 15 to encounter and mix with the gas flow uprising through the conduit exteriorly about the line 14 and is pumped in reaction to the buoyancy and input pressures of the gas, and with cooling and wetting effect on the gases, as a gas-water mixture upwardly through and outwardly from the open upper end of the conduit. The gas-water mixture discharged through the annular opening about the line 14 at the upper end of the conduit 13 is received within a tubular deflector 17 fixed by means of its closed, interiorly-concave upper end 18 to the line 14 spacedly above the adjacent end of the conduit 13 to telescope over and spacedly about the upper end of the conduit with its open lower end above the maximum level height of the water charge, whereby to direct the heavier components of the discharge from the upper end of the conduit to, for recirculation with, or for settlement within said charge. A frusto-conical baffle 19 is sealed at its greater base margin to and fixed transversely of the casing 10 above the lower end of the deflector 17 and inclines upwardly and inwardly of the casing to dispose the margin of its open lesser base spacedly adjacent and concentrically about the closed end 18 of the said deflector, whereby to define a restricted annular throat between said deflector and the baffle 19 wherethrough the vaporous components of the discharge from the upper end of the conduit 13 pass to the portion of the casing above the baffle as they are released from and rise outwardly and upwardly past the deflector. As should be manifest, the deflector 17 and baffle 19 function to effectively separate the vaporous components from the associated liquid and wetted solids of the discharge from the upper end of the conduit 13 and to isolate said vaporous components in the portion of the casing above the baffle with return of the heavier discharge components to the water charge in the lower end of the casing.

Closing interiorly and transversely of the casing 10 about the conduit 13 above the apertures 15 and well below the maximum level height of the water charge, a foraminous or reticulate sheet 20 supports a bed 21 of broken limerock, or the equivalent, within the water charge in a disposition such that water from the portion of the charge above said bed must traverse the latter before it can enter the apertures 15, thus to intimately and repetitiously expose the acidic characteristics of the dissolved gases and gas-water mixtures returned to the water charge to the ameliorating influences of the material of the bed 21 and to maintain the water charge in condition for repetitious use in the treatment of the incoming gases. To facilitate incharge and replenishment of the bed 21, a handhole normally closed by a removable cap 22 may be provided in appropriate intersecting relation with the wall of the casing 10.

Interiorly and transversely of the casing 10 about the line 14 and immediately above the open lesser base of the baffle 19, a second foraminous or reticulate sheet 23 supports a bed 24 of broken limerock, or the equivalent, obstructing the upper portion of the casing in spaced relation with the detachable plate 12 and covering and surrounding a plate 25 fixedly outstanding from and radially of the line 14 in spaced parallelism with and above the sheet 23 with its free margin spaced from the casing wall and outwardly overhanging the lesser base of the baffle 19. Fixed to and depending from the detachable plate 12 in concentric relation with and spacedly about the line 14, a reticulate or foraminous sleeve 26 closes at its open lower end against the upper surface of the bed 24 to define therewith an annular open space interiorly and adjacent the upper, outer corner of the casing from which an outlet 27 leads to atmosphere, and an extension 24' of the bed 24 rises within and fills the sleeve 26 to close against the plate 12.

Washed gases and entrained wet vapors uprising within the casing 10 through the annular throat between the baffle 19 and deflector 17 encounter and are constrained to diffuse through the bed 24 where they are intimately and repetitiously exposed to the ameliorating influences of the material composing the bed, scrubbed and dewatered with consequent wetting of the bed component surfaces, relieved of their acidic characteristics, and conditioned for discharge through the outlet 27 in cool, dry, and harmless state, the plate 25 functioning to divert and spread the vaporous flow through the bed 24 throughout and into prolonged contact with the elements of the bed, and the bed extension 24' functioning to supplement and enhance the ameliorating and scrubbing action of the bed 24, in an obvious manner.

The vapors which diffuse through the beds 24 and 24' carry a considerable proportion of water which condenses upon, absorbs to, and washes over the surfaces of the bed components with eventual drip through the sheet 23 and entrapment within the angle between the baffle 19 and wall of the casing 10, and a by-pass 28, which may take the form of an be also utilized as a water level sight glass, connects between a low point of the angle just mentioned and the casing interior well below the maximum water level height therein for return of the drip from the beds 24 and 24' to and for reuse with the principal water charge of the apparatus. A removable plug 29 at the upper end of the by-pass 28 exterior to the casing 10 may be provided as a convenient means for supplying and for replenishing the water charge requisite for the intended operation of the conditioner.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as may invention:

1. An exhaust gas conditioner comprising a closed, vertically elongated casing adapted to confine a charge of water in its lower portion, an outlet to atmosphere at the upper end of said casing, a bed of broken limerock transversely obstructing the lower portion of said casing spacedly above the bottom thereof, whereby said bed is positioned for submergence within the water charge confined by the casing, means reactive to the input of exhaust gases to said casing below said bed to intermix the gases with water from below the bed and to circulate the resultant mixture upwardly of the casing to discharge within the upper portion thereof, a second bed of broken limerock transversely obstructing the casing upper portion between the discharge end of said means and said outlet, and means definitive of a tortuous flow passage between said outlet and the discharge end of said first means effective to dewater the vapors thereby traversed.

2. An exhaust gas conditioner comprising a closed, vertically elongated casing adapted to confine a charge of water in its lower portion and formed with an outlet to atmosphere at its upper end, a bed of broken limerock transversely obstructing the lower portion of said casing spacedly above the bottom thereof, whereby said bed is positioned for submergence within the water charge confined by the casing, means reactive to the input of exhaust gases to said casing below said bed to intermix the gases with water from below the bed and to circulate the resultant mixture upwardly of the casing to discharge within the upper portion thereof, a deflector spacedly and telescopically associated with the discharge end of said means for the direction of outflow from said means toward the casing lower portion, a second bed of broken limerock transversely obstructing the casing between said deflector and said outlet, a frusto-conical baffle sealed to and instanding upwardly of said casing below said second bed with its open lesser base spacedly surrounding said deflector, and a by-pass about said baffle for return to the casing lower portion of drip collected thereon.

3. An exhaust gas conditioner comprising a closed, vertically elongated casing adapted to confine a charge of water in its lower portion and formed with an outlet to atmosphere at its upper end, a bed of broken limerock transversely obstructing the lower portion of said casing spacedly above the bottom thereof, whereby said bed is positioned for submergence within the water charge confined by the casing, means reactive to the input of exhaust gases to said casing below said bed to intermix the gases with water from below the bed and to circulate the resultant mixture upwardly of the casing to discharge within the upper portion thereof, a deflector spacedly and telescopically associated with the discharge end of said means for the direction of outflow from said means toward the casing lower portion, a second bed of broken limerock transversely obstructing the casing between said deflector and said outlet, a frusto-conical baffle sealed to and instanding upwardly of said casing below said second bed with its open lesser base spacedly surrounding said deflector, a plate centrally and transversely of said casing within said second bed peripherally spaced inwardly from the casing and spacedly registered in overhanging relation with the open lesser base of said baffle, and a by-pass about said baffle for return to the casing lower portion of drip collected thereon.

4. An exhaust gas conditioner comprising a closed, vertically elongated casing adapted to confine a charge of water in its lower portion and formed with an outlet to atmosphere at its upper end, a bed of broken limerock transversely obstructing the lower portion of said casing spacedly above the bottom thereof, whereby said bed is positioned for submergence within the water charge confined by the casing, means reactive to the input of exhaust gases to said casing below said bed to intermix the gases with water from below the bed and to circulate the resultant mixture upwardly of the casing to discharge within the upper portion thereof, a deflector spacedly and telescopically associated with the discharge end of said means for the direction of outflow from said means toward the casing lower portion, a second bed of broken limerock transversely obstructing the casing between said deflector and said outlet below the latter, a frusto-conical baffle sealed to and instanding upwardly of the casing below said second bed with its open lesser base spacedly surrounding said deflector, a plate centrally and transversely of the casing within said second bed peripherally spaced inwardly from the casing and spacedly registered in overhanging relation with the open lesser base of said baffle, a central, upward extension of said second bed closing against the upper end of the casing to define an annular chamber communicating with said outlet, and a by-pass about said baffle for return to the casing lower portion of drip collected thereon.

5. In an exhaust gas conditioner having a closed, vertically elongated casing adapted to confine a charge of water in its lower portion and formed with an outlet to atmosphere at its upper end, and means reactive to the input of exhaust gases adjacent the casing lower end to intermix said gases with the water of the charge and to circulate the resultant mixture upwardly of the casing to discharge within the upper portion thereof, means for suppressing the acidic characteristic of the gases and gas-water mixtures, said latter means comprising a bed of broken limerock transversely obstructing the lower portion of the casing, whereby said bed is positioned for submergence within the water charge between the gas input zone and the discharge end of said first means, as a medium wherethrough the water of the charge is repetitiously washed between and over the surfaces of the elements composing said bed during operation of said first means.

6. In an exhaust gas conditioner having a closed, vertically elongated casing adapted to confine a charge of water in its lower portion and formed with an outlet to atmosphere at its upper end, and means reactive to the input of exhaust gases adjacent the casing lower end to intermix said gases with the water of the charge and to circulate the resultant mixture upwardly of the casing to discharge within the upper portion thereof, means for thoroughly diffusing, dewatering, and ameliorating the vapors discharged by said first means, said latter means comprising a deflector spacedly and telescopically associated with the discharge end of said first means for the downward direction of the outflow from the latter, a frusto-conical baffle sealed to and instanding upwardly of the casing with its open lesser base spacedly surrounding said deflector to define therewith a narrow annular throat as the sole uprise passage for the vapors, and a bed of broken limerock transversely obstructing the casing between said throat and the outlet to atmosphere.

7. In an exhaust gas conditioner having a closed, vertically elongated casing adapted to confine a charge of water in its lower portion and formed with an outlet to atmosphere at its upper end, and means reactive to the input of exhaust gases adjacent the casing lower end to intermix said gases with the water of the charge and to circulate the resultant mixture upwardly of the casing to discharge within the upper portion thereof, means for thoroughly diffusing, dewatering, and ameliorating the vapors discharged by said first means, said latter means comprising a deflector spacedly and telescopically associated with the discharge end of said first means for the downward direction of the outflow from the latter, a frusto-conical baffle sealed to and instanding upwardly of the casing with its open lesser base spacedly surrounding said deflector to define therewith a narrow annular throat as the sole uprise passage for the vapors, a bed of broken limerock transversely obstructing the casing between said throat and the outlet to atmosphere, and a plate centrally and transversely of the casing within said bed peripherally spaced inwardly from the casing and spacedly registered in overhanging relation with the open lesser base of said baffle.

8. In an exhaust gas conditioner having a closed, vertically elongated casing adapted to confine a charge of water in its lower portion and formed with an outlet to atmosphere at its upper end, and means reactive to the input of exhaust gases adjacent the casing lower end to intermix said gases with the water of the charge and to circulate the resultant mixture upwardly of the casing to discharge within the upper portion thereof, means for thoroughly diffusing, dewatering, and ameliorating the vapors discharged by said first means, said latter means comprising a deflector spacedly and telescopically associated with the discharge end of said first means for the downward direction of the outflow from the latter, a frusto-conical baffle sealed to and instanding upwardly of the casing with its open lesser base spacedly surrounding said deflector to define therewith a narrow annular throat as the sole uprise passage for the vapors, a bed of broken limerock transversely obstructing the casing between said throat and the outlet to atmosphere below the latter, a plate centrally and transversely of the casing within said bed peripherally spaced inwardly from the casing and spacedly registered in overhanging relation with the open lesser base of said baffle, and a central, upward extension of said bed closing against the upper end of the casing to define an annular chamber communicating with said outlet.

References Cited in the file of this patent
UNITED STATES PATENTS

| | | |
|---|---|---|
| 2,677,601 | Ruth | May 4, 1954 |
| 2,678,261 | Ruth | May 11, 1954 |